United States Patent Office 3,706,735
Patented Dec. 19, 1972

3,706,735
BASIC DERIVATIVES OF 5H-DIBENZ[b,f]
AZEPINES
Alfred Sallmann, Bottmingen, and Rudolf Pfister, Basel, Switzerland, assignors to Ciba-Geigy Corporation, Ardsley, N.Y.
No Drawing. Filed Aug. 19, 1970, Ser. No. 65,350
Claims priority, application Switzerland, Aug. 20, 1969, 12,583/69
Int. Cl. C07d 41/08
U.S. Cl. 260—239 D       3 Claims

ABSTRACT OF THE DISCLOSURE

2 - (2 - aminoethyl) - 10,11 - dihydro - 5H - dibenz[b,f]azepines optionally substituted in 5-position by methyl or ethyl and at the basic nitrogen atom of the sidechain by methyl, as well as their pharmaceutically acceptable acid addition salts, have anti-inflammatory and analgesic activity; the compounds are useful for the treatment of inflammatory diseases and for alleviating pain in mammals, and are active ingredients of pharmaceutical compositions; a typical embodiment is 2-(2-aminoethyl)-10,11-dihydro-5H-dibenz[b,f]azepine.

DETAILED DESCRIPTION

The present invention relates to basic derivatives of 5H-dibenz[b,f]azepine having valuable pharmacological properties, to their pharmaceutically acceptable acid addition salts, as well as to pharmaceutical compositions containing such substances, and to their use.

More particularly, the present invention relates to compounds of formula

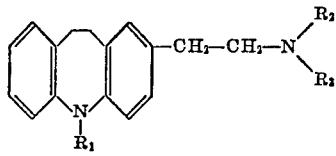

(I)

wherein $R_1$ is hydrogen, methyl or ethyl;
$R_2$ and $R_3$ independently of each other are hydrogen or methyl;

and the pharmaceutically acceptable acid addition salts thereof, which compounds possess valuable pharmacological properties. In particular, they have anti-inflammatory, anti-edematous, analgesic and anti-pyretic actions combined with a flavourable therapeutic index and, advantageously, only slight gastrointestinal side effects. The anti-inflammatory activity is demonstrated in the "bolus alba edema test" according to G. Wilhelmi, Jap. J. Pharmacol. 15, 187 (1965), whereby the reduction of swelling of the edema of the rats' paw after oral or parenteral administration of the test compounds is determined. For example, upon oral administration of about 10 mg./kg. of 2 - (2 - aminoethyl) - 10,11 - dihydro - 5 - methyl - 5H-dibenz[b,f]azepine hydrochloride, significant activity is found.

The analgesic activity is determined in the "writhing test" according to E. Siegmund, R. Cadmus and G. Lu, Proc. Soc. Exp. Biol. Med. 95, 729 (1957), whereby the amount of test substance is determined, preventing the pain syndrome produced in mice after intraperitoneal injection of 2-phenyl-1,4-benzoquinone. 2-(2-methylaminoethyl)-10-11-dihydro-5H - dibenz[b,f]azepine hydrochloride, for example, shows significant activity upon oral administration of about 58 mg./kg.

The compounds of the invention are used orally, rectally or parenterally, especially intramuscularly, for the treatment of rheumatic, arthritic and other inflammatory diseases, and for the alleviation of pains of various origin.

The compounds of Formula I and the acid addition salts thereof, are produced, according to a first process, by reacting a reactive ester of an alcohol of formula

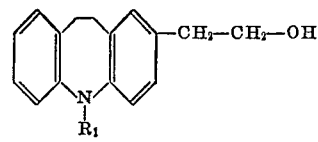

(II)

wherein $R_1$ has the meaning given under Formula I, with ammonia or with an amine of formula

(III)

wherein $R_2$ and $R_3$ have the meaning given under Formula I; and, optionally, converting the obtained compound of Formula I into a pharmaceutically acceptable acid addition salt. Suitable reactive esters of alcohols of Formula II are, e.g. hydrohalic acid esters such as chlorides, bromides or iodides, as well as sulfonic acid esters, especially arenesulfonic acid esters, such as p-toluenesulfonic acid ester or methanesulfonic acid ester. The reactions are preferably performed in a suitable organic medium, e.g. in an aromatic hydrocarbon such as benzene, toluene or xylene; in a lower alkanol or another aliphatic hydroxy compound such as methanol, ethanol, n-butanol, 2-methoxyethanol; or in an ethereal liquid such as dibutyl ether, ethylene glycol ether or diethylene glycol dimethyl ether, tetrahydrofuran or dioxane, and/or an excess of the compound of Formula III. An excess of the compound of Formula III can, at the same time, act as an acid-binding agent, but as such it is also possible to use tertiary organic bases such as, e.g. diisopropylethylamine, pyridine or sym.collidine, or inorganic basic substances such as, e.g. potassium carbonate. The reactions are performed at room temperature, or at elevated temperatures up to ca. 180°, preferably between ca. 90° and 130°, and, if required, in a closed vessel. The alcohols of Formula II and their reactive esters are, for their part, new compounds, the production of which is described below.

Using a second process compounds of Formula I and their acid addition salts are produced by reducing, by means of a complex hydride, a compound of formula

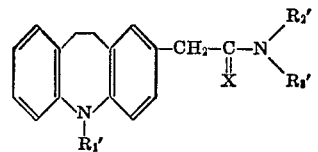

(IV)

wherein $R_1$ is hydrogen, methyl, ethyl, formyl or acetyl,
X is oxygen, and
$R_2'$ and $R_3'$ correspond to the definition given under Formula I for $R_2$ and $R_3$, or with a compound of Formula IV, wherein X represents two hydrogen atoms;
$R_2'$ is formyl; and
$R_3'$ is hydrogen or methyl;

and, optionally, converting the obtained compound of Formula I into a pharmaceutically acceptable acid addition salt. The reduction of the compounds of Formula IV is performed, e.g. by means of diborane or lithium aluminum hydride in an ethereal solvent such as tetrahydrofuran, dioxane, diethyl ether, dibutyl ether, or diethylene glycol dimethyl ether, at temperatures between ca. 0° and 100°, or at the boiling temperature of the stated solvents. If $R_1'$ denotes a formyl or acetyl group which is to be reduced, then the amount of complex hydride, preferably diborane, has to be correspondingly increased. The diborane is separately produced, and then fed in either before, or in the course of, the reduction; or it is formed in situ, e.g. from potassium borohydride and boron trifluoride etherate. The production of the likewise new starting materials of Formula IV is described below.

Using a third process, compounds of Formula I, wherein $R_2$ and $R_3$ represent hydrogen atoms, and their acid addition salts, are obtained by reducing a nitrile of formula

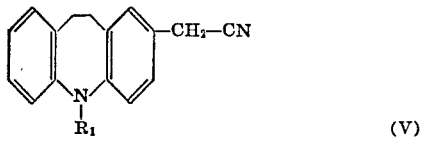

(V)

wherein $R_1$ has the meaning given under Formula I; and, optionally, converting the obtained compound of Formula I into a pharmaceutically acceptable acid addition salt. The reduction is performed, e.g. by means of hydrogen in the presence of a hydrogenation catalyst such as, e.g. Raney nickel, in an organic solvent such as, e.g. methanol, at elevated temperature and under increased presure, e.g. at 50–100° and under ca. 100–200 atm., and preferably in the presence of ammonia.

The reaction can also be performed using complex hydrides in suitable solvents. The reduction of the compounds of Formula V is carried out, e.g. by means of lithium aluminium hydride or diborane in an ethereal solvent such as diethyl ether, tetrahydrofuran, dibutyl ether, ethylene glycol dimethyl ether (1,2-dimethoxyethane) or diethylene glycol dimethyl ether, or with bis-(2-methoxyethyl)-sodium dihydrogen aluminate in benzene or toluene, at temperatures between ca. 0° and 100°, or at the boiling temperature of the applied solvent. The diborane is produced separately, either beforehand, or in the course of the reduction, and then fed in, or it is formed in situ, e.g. from sodium or potassium borohydride and boron trifluoride etherate.

The production of the nitriles of Formula V required as starting materials, is described below.

Using a fourth process, compounds of Formula I, wherein $R_1$ denotes hydrogen, and their acid addition salts, are produced by allowing to act on a compound of formula

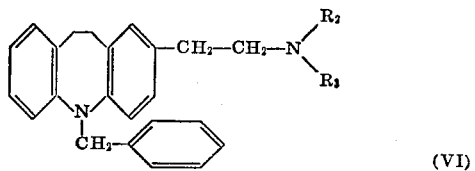

(VI)

wherein $R_2$ and $R_3$ have the meaning given under Formula I, a concentrated solution of hydrogen chloride and hydrogen bromide or catalytically activated hydrogen; and, optionally, converting the obtained compound of Formula I into a pharmaceutically acceptable acid addition salt. For example, a compound of Formula VI is heated with saturated aqueous hydrobromic acid to temperatures between ca. 80° and the boiling temperature of the acid, or on a compound of Formula VI is allowed to act at room temperature, a methanolic solution saturated with hydrochloric acid gas. The hydrogenolytic splitting off of the benzyl group is effected, for example, with the use of noble metal catalysts, e.g., a palladium charcoal catalyst, in the presence of a little perchloric acid, in suitable organic solvents such as methanol, ethanol or dioxane, at normal or at moderately increased pressure and likewise temperature. The production of the new starting materials of Formula VI is described below.

Using a fifth process, compounds of Formula I, wherein each of $R_2$ and $R_3$ is hydrogen, are produced by reducing a compound of formula

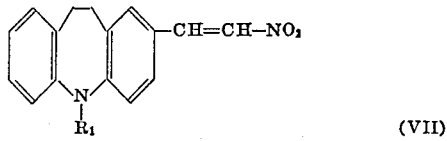

(VII)

wherein $R_1$ is hydrogen, methyl or ethyl; and, optionally, converting the obtained compound of Formula I, wherein each of $R_2$ and $R_3$ is hydrogen, into a pharmaceutically acceptable acid addition salt.

The reduction of the compounds of Formula VII is performed, e.g. by means of complex hydrides, such as lithium aluminium hydride or diborane, under the conditions given in the second process, or by catalytic hydrogenation (Houben-Weyl, vol. 11/I, p. 392–393) e.g. in the presence of a palladium charcoal catalyst, in a mixture of glacial acetic acid and hydrochloric acid. The production of starting materials of Formula I is described below.

Using a sixth process, compounds of Formula I, wherein each of $R_2$ and $R_3$ is hydrogen, are produced by hydrolizing, in acid medium, a compound of formula

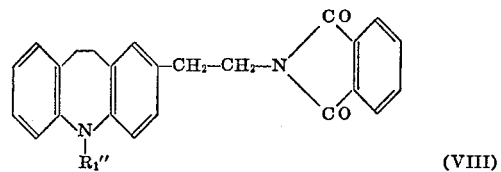

(VIII)

wherein $R_1''$ is hydrogen, methyl, ethyl or benzyl, optionally after prior reaction with hydrazine, and, if necessary, with cleavage of an existing benzyl group as $R_1'''$; and, if desired, liberating the compound of Formula I, wherein each of $R_2$ and $R_3$ is hydrogen, and converting it into a pharmaceutically acceptable acid addition salt.

An acid, e.g. a diluted mineral acid, is used for the hydrolysis, and the reaction mixture is heated. A careful hydrolytic cleavage is performed, e.g. by first boiling a compound of Formula VIII for a few hours with hydrazine hydrate in ethanol, then adding hydrochloric acid, and boiling for a further ca. 10–30 minutes to split off the phthalazinone derivative obtained as intermediate product. The production of the starting materials of Formula VIII is described below.

The starting materials required for the various processes are produced by starting with, e.g. 5-methyl-, 5-ethyl- or 5-benzyl-10,11-dihydro-5H-dibenz[b,f]azepine. All three compounds are mentioned in the Swiss Pat. No. 399,637 of J. R. Geigy A.G. The production of the 5-methyl compound is described in Chem. Ber. 93, 392–397 (1960); the two other compounds can be produced analogously. The stated compounds are first condensed with dimethylformamide and phosphorus oxychloride, according to Vilsmeier, to the corresponding 5-substituted 10,11-dihydro-5H-dibenz[b,f]azepine-2-carboxaldehydes [cp. in this respect B. A. Porai-Koshits, I.Ya. Kvito and O. V. Favorskii, Zh. Organ. Khim. 1 (8), 1516–1517 (1965), CA 64, 698 d]; and these then reduced to the corresponding 10,11-dihydro-5H-dibenz[b,f]azepine - 2 - methanols which, on being treated with thionyl chloride in pyridine, or with hydrogen bromide in chloroform, yield 2-chloromethyl- and 2-bromomethyl-5-alkyl- or -benzyl-10,11-dihydro-5H-dibenz[b,f]azepines, respectively. By reaction of these with alkali cyanides are obtained 5-methyl-, 5-ethyl- or 5-benzyl-10,11-dihydro-5H-dibenz[b,f]azepine-2-acetonitrile. The first two nitriles are starting materials of Formula V for the third mentioned process. 10,11-dihydro - 5H - dibenz[b,f]azepine-2-acetonitrile, likewise embraced by Formula V, is obtained by hydrogenolysis of the corresponding 5-benzyl compound, analogously to the fourth mentioned process for the production of certain compounds of Formula I. By hydrolysis of the nitriles of Formula V to the corresponding carboxylic acids, and reduction of these with complex hydrides, e.g. with lithium aluminium hydride in tetrahydrofuran, are obtained the alcohols of Formula II, which are converted, by the usual methods, into their reactive esters. For example, the alcohols of Formula II are reacted with thionyl chloride in pyridine to give corresponding 2-chloroethyl compounds; or they are converted with p-toluenesulfochloride in pyridine into their p-toluenesulfonic acid esters. Furthermore, from the nitriles of Formula V, it is possible, by treatment with hydrogen peroxide or by partial hydrolysis, to directly produce starting materials of Formula IV, wherein X is oxygen, and each of $R_2'$ and $R_3'$ is hydrogen, and $R_1'$ is hydrogen, the methyl group or ethyl group. If the already mentioned carboxylic acids obtainable by hydrolysis of the nitriles of Formula V are converted into their halides or lower alkyl esters, and these reacted with amines of Formula III, then further starting materials of Formula IV are obtained, wherein X is oxygen. Moreover, compounds of Formula IV (wherein X is oxygen and $R_1$ is hydrogen) or intermediate products thereof, can be formylated or acetylated in the 5-position. On the other hand, starting materials of Formula IV, wherein X is formyl, $R_3'$ is hydrogen, and $R_1'$ has all the meanings given under Formula IV, are obtained by hydrogenating, e.g. the nitriles of Formula V, according to the third mentioned production process, to compounds of Formula I, having hydrogen atoms as $R_2$ and $R_3$; and then formylating these compounds in the aliphatically bound amino group and, optionally, also formylating or acetylating in the 5-position. In an analogous manner are obtained starting materials of Formula IV having two hydrogen atoms as X, and a methyl or ethyl group as $R_3'$, by mono- or optionally diacylation of such compounds of Formula I, wherein $R_1$ can have all meanings given under Formula I, $R_2$ is hydrogen, and $R_3$ is methyl or ethyl, and which, for their part, are obtained, e.g. by the first mentioned or second mentioned production process. Starting materials of Formula VI are obtained fully and analogously to the reaction sequences leading to the compounds of Formula I, by starting with the already mentioned 5-benzyl-10,11-dihydro-5H-dibenz[b,f]azepine, instead of with 5-methyl- or 5-ethyl-10,11-dihydro-5H-dibenz[b,f]azepine.

Starting materials of Formula VII are obtained by reacting a 10,11-dihydro-5H-dibenz[b,f]azepine-2-carboxaldehyde (optionally substituted in the 5-position with hydrogen, a methyl group or an ethyl group) with nitromethane, e.g. by boiling in glacial acetic acid in the presence of ammonium acetate or sodium acetate.

Phthalimides of Formula VIII are produced by converting an above described 10,11-dihydro-5H-dibenz[b,f]azepine-2-methanol (optionally substituted in the 5-position with a methyl group or an ethyl group) into its reactive ester, e.g. into p-toluenesulfonic acid ester, or into the correspondingly substituted halides, and reacting these with phthalimide potassium.

Optionally, the basic derivatives of 5H-dibenz[b,f]azepine of Formula I obtained by the process according to the invention, are subsequently converted, in the usual manner, into their addition salts with inorganic and organic acids. For example, to a solution of a compound of Formula I in an organic solvent, such as acetone, dioxane, methanol or ethanol, or diethyl ether, is added the acid desired as salt component, or a solution of the acid; and the salt separated which has precipitated immediately, or after the addition of a second organic liquid such as e.g. diethyl ether to methanol or acetone, or of water to water-miscible solvents, such as acetone or dioxane.

A part of the salts are isolated as hydrates, or are converted, in the presence of atmospheric moisture, into hydrates. The hydrates, for their part, crystallize well, are not hygroscopic, and are readily soluble, e.g. in water.

Instead of free bases, as active substances for medicaments, pharmaceutically acceptable acid addition salts can be used, i.e. salts with acids of which the anions, in the case of the dosage amounts in question, have either no inherent pharmacological action or a desired one. For salt formation with compounds of Formula I it is possible to use, e.g. hydrochloric acid, hydrobromic acid, sulfuric acid, phosphoric acid, methanesulfonic acid, ethanedisulfonic acid, β-hydroxyethanesulfonic acid, acetic acid, malic acid, tartaric acid, citric acid, lactic acid, succinic acid, fumaric acid, maleic acid, ascorbic acid, benzoic acid, salicylic acid, phenylacetic acid, mandelic acid, embonic acid or 1,5-naphthalenedisulfonic acid.

For their intended use, the compounds of the invention are administered orally, rectally or parenterally in amounts depending on the species and the age, weight and particular condition of the individual being treated. In general, the daily dosages for mammals vary between 1 and 30 mg./kg. of body weight. Suitable dosage units such as dragées, tablets, suppositories or ampoules, contain as active substance preferably 10–250 mg. of a compound of Formula I, or of a pharmaceutically acceptable acid addition salt thereof.

In dosage units for oral administration, the content of active substance is preferably between 10% and 90%. Such dosage units are produced by combining the active substance, e.g. with solid pulverulent carriers such as, lactose, saccharose, sorbitol, mannitol; starches such as potato starch, maize starch or amylopectin, also laminaria powder or citrus pulp powder; cellulose derivatives or gelatine, optionally with the addition of lubricants such as magnesium or calcium stearate, or polyethylene glycols, to form tablets or dragée cores. The latter are coated, e.g. with concentrated sugar solutions which can also contain, e.g. gum arabic, talcum and/or titanium dioxide; or with a lacquer dissolved in readily volatile organic solvents or mixtures of solvents. Dye-stuffs may be added to these coatings, e.g. to distinguish between varying dosages of active substance. Further suitable dosage units for oral administration are hard gelatine capsules as well as soft closed capsules made from gelatine and a softener, such as glycerin. The hard capsules contain the active substance preferably as a granulate in admixture with lubricants, such as talcum or magnesium stearate, and, optionally, stabilizers such as sodium metabisulfite ($Na_2S_2O_5$) or ascorbic acid. In soft capsules, the active substance is preferably dissolved or suspended in suitable liquids such as liquid polyethylene glycols, whereby stabilizers may also be added.

Suitable dosage units for rectal administration are, e.g. suppositories consisting of a combination of an active substance with a suppository foundation material based on natural or synthetic triglycerides (e.g. cocoa butter), polyethylene glycols, or suitable higher fatty alcohols; and gelatine rectal capsules containing a combination of the active substance with polyethylene glycols.

Ampoule solutions for parenteral administration, especially intramuscular, and also intravenous administration, contain, e.g. a compound of Formula I, in a concentration of preferably 0.5–5%, as an aqueous dispersion prepared with the aid of the usual solubility-promoting agents, and/or emulsifiers, as well as, optionally, stabilizers; or they contain an aqueous, preferably 0.5–10% solution of a pharmaceutically acceptable, water-soluble acid addition salt of a compound of Formula I.

Further parenteral preparations are, e.g. lotions, tunctures and ointments (prepared using conventional auxiliary agents) for percutaneous administration.

The following prescriptions further illustrate the production of pharmaceutical compositions.

(a) 500 g. of active substance, e.g. 2-(2-aminoethyl)-10,11 - dihydro - 5 - methyl - 5H - dibenz[b,f]azepine hydrochloride, are mixed with 550 g. of lactose and 292 g. of potato starch; the mixture is moistened with an alcoholic solution of 8 g. of gelatine, and granulated through a sieve. After drying of the granulate, 60 g. of potato starch, 60 g. of talcum and 110 g. of magnesium stearate and 20 g. of highly dispersed silicon dioxide are mixed in; the mixture is then pressed into 10,000 tablets each weighing 150 mg. and each containing 50 mg. of active substance. Optionally, the tablets may be provided with grooves for a more precise adjustment of the dosage amount.

(b) An amount of 25 g. of active substance, e.g. 2-(2-aminoethyl) - 10,11 - dihydro-5H-dibenz[b,f]azepine hemifumarate, is well mixed together with 16 g. of maize starch and 6 g. of highly dispersed silicon dioxide; the mixture is moistened with a solution of 2 g. of stearic acid, 6 g. of ethyl cellulose and 6 g. of stearin in ca. 70 ml. of isopropyl alcohol; and granulated through a sieve III (Ph. Helv. V.). The granulate is dried for ca. 14 hours, and is then put through sieve III–IIIa. It is afterwards mixed with 16 g. of maize starch, 16 g. of talcum and 2 g. of magnesium stearate; the mixture is then pressed to form 1000 dragée cores. These are coated with a concentrated syrup made from 2 g. of lacca, 7.5 g. of gum arabic, 0.15 g. of dyestuff, 2 g. of highly dispersed silicon dioxide, 25 g. of talcum and 53.55 g. of sugar; and finally dried. The obtained dragées each weigh 185 mg. and each contain 25 mg. of active substance.

(c) 50 g. of 2-(2-aminoethyl)-10,11-dihydro-5H-dibenz[b,f]azepine hemifumarate and 1950 g. of finely ground suppository foundation substance (e.g. cocoa butter) are thoroughly mixed, and then melted. From the melt, maintained homogeneous by stirring, are poured 1000 suppositories each weighing 2 g., and each containing 50 mg. of active substance.

(d) 2.5 g. of 2-(2-aminoethyl)-10,11-dihydro-5-methyl-5H-dibenz[b,f]azepine hydrochloride and 0.10 g. of ascorbic acid are dissolved in distilled water, and diluted to 100 ml. The obtained solution is used to fill ampoules each having a content, e.g. of 1 ml., corresponding to a content of 25 mg. of active substance. The filled ampoules are sterilised as usual in the heat.

(e) 2 g. of 2-(2-aminoethyl)-10,11-dihydro-5-methyl-5H-dibenz[b,f]azepine hydrochloride and 4.4 g. of glycerin are dissolved in distilled water to give 200 ml.; the solution is then filled into 100 ampoules each of 2 ml. content, and each containing 20 mg. of active substance.

Instead of the active substance mentioned in (a) to (e), it is also possible to use, e.g. identical amounts of 2-(2-aminoethyl) - 5 - ethyl-10,11-dihydro-5H-dibenz[b,f] azepine hydrochloride, or of 10,11-dihydro-5-methyl-2-[2-(methylamino)-ethyl]-5H-dibenz[b,f]azepine hydrochloride.

The following examples further illustrate the production of the new basic derivatives of 5H-dibenz[b,f]azepine corresponding to Formula I, but the examples in no way limit the scope of the invention. The temperatures are given in degrees centigrade.

Example 1

(a) 5-methyl-10,11-dihydro - 5H - dibenz[b,f]azepine-2-carboxaldehyde.—To 120 ml. of dimethylformamide are added dropwise at 10°, within 10 minutes, 61 g. of distilled phosphorus oxychloride. The whole is cooled to 0°; to this is then added dropwise within one hour, at 10° at the most and whilst good stirring is maintained, a solution of 28.0 g. of 5-methyl-10,11-dihydro-5H-dibenz[b,f] azepine (M.P. 106–107° from ethanol, produced by condensation of 10,11-dihydro-5H-dibenz[b,f]azepine with methyl iodide by means of sodium hydride in dimethylformamide) in 160 ml. of dimethylformamide. The reaction mixture is thereupon stirred for 2 hours at room temperature and for one hour at 75°. The dark-orange mixture is cooled and poured on to 2000 g. of ice, whereby the crude aldehyde precipitates as resin. The formed suspension is adjusted by means of concentrated sodium carbonate solution to pH 7; and then extracted with chloroform. The chloroform solution is washed with water, dried over calcium chloride, and concentrated in vacuo. The resin remaining behind is dissolved, with heating, in 350 ml. of cyclohexane. The 5-methyl-10,11-dihydro-5H-dibenz[b,f]azepine - 2 - carboxaldehyde, crystallising on cooling, is filtered off under suction, M.P. 91–93°.

5-ethyl-10,11 - dihydro - 5H - dibenz[b,f]azepine-2-carboxaldehyde, M.P. 114–116° (from ethyl acetate/ether) is obtained in an analogous manner starting with 30.0 g. of 5-ethyl-10,11-dihydro-5H-dibenz[b,f]azepine (M.P. 37–42° from ether/petroleum ether, analogously prepared as the 5-methyl compound, however, using ethyl iodide).

(b) 5-methyl-10,11-dihydro - 5H - dibenz[b,f]azepine-2-methanol.—An amount of 7.6 g. of lithium aluminium hydride is suspended in 120 ml. of abs. ether and, whilst stirring is maintained, cooled to 5°. To this suspension is slowly added dropwise, under nitrogen and with external cooling with an ice bath, a solution of 23.7 g. of 5-methyl-10,11-dihydro-5H-dibenz[b,f]azepine-2-carboxaldehyde in 130 ml. of abs. ether and 80 ml. of abs. tetrahydrofuran. The mixture is subsequently stirred for 18 hours at room temperature. To the mixture (cooled to 5°) are added dropwise, with stirring, 8 ml. of water, 8 ml. of 15% sodium hydroxide solution, and a further 24 ml. of water. Stirring proceeds for 2 hours at room temperature followed by filtration. The filtrate is concentrated by evaporation under 11 torr at 40°, and the residue crystallised from ether/petroleum ether. The 5-methyl-10,11-dihydro-5H-dibenz[b,f]azepine-2-methanol melts at 78–79°.

5-ethyl-10,11-dihydro - 5H - dibenz[b,f]azepine-2-methanol, M.P. 70–72° (from ether/petroleum ether), is produced analogously using 25.0 g. of 5-ethyl-10,11-dihydro-5H-dibenz[b,f]azepine-2-carboxaldehyde.

(c) 2 - chloromethyl - 5 - methyl-10,11-dihydro-5H-dibenz[b,f]azepine.—A solution of 160.5 g. of 5-methyl-10,11-dihydro-5H-dibenz[b,f]azepine-2-methanol in 2500 ml. of abs. ether and 246 ml. of abs. pyridine is quickly added dropwise to a solution, cooled to 0°, of 246 ml. of thionyl chloride and 246 ml. of pentane. The mixture is afterwards stirred for one hour at 0°, and is then poured on to a mixture of 5000 g. of ice and 300 ml. of 2 N hydrochloric acid; 3000 ml. of ether are added, the whole is shaken, the ether phase separated and filtered through Hyflo. The filtrate is extracted with 1000 ml. of water, 500 ml. of 2 N sodium hydroxide solution, and with a further 500 ml. of water; it is then dried over sodium sulphate, and concentrated under 11 torr at 40° to dryness. The 2-chloromethyl - 5 - methyl-10,11-dihydro-5H-dibenz[b,f] azepine remains behind as yellow oil.

In an analogous manner is obtained as oil: 2-chloromethyl - 5 - ethyl - 10,11-dihydro-5H-dibenz[b,f]azepine, starting with 170.0 g. of 5-ethyl-10,11-dihydro-5H-dibenz [b,f]azepine-2-methanol.

(d) 5-methyl-10,11-dihydro - 5H - dibenz[b,f]azepin-2-acetonitrile.—To a suspension of 23.0 g. of sodium cyanide in 500 ml. of dimethyl sulphoxide is added at 40°, with stirring, a solution of 33.0 g. of 2-chloromethyl-5-methyl-10,11-dihydro-5H-dibenz[b,f]azepine in 150 ml. of dimethyl sulphoxide. The mixture is then stirred for 15 hours at 40°, and diluted with 3500 ml. of ice water. The solution is extracted four times with 2000 ml. of ethyl acetate. The ethyl acetate solutions are washed with 110 ml. of 6 N hydrochloric acid, and afterwards with 500 ml. of water; they are then dried with magnesium sulphate, and concentrated by evaporation under 11 torr at 40°. The residue is dissolved in 3000 ml. of ether; the ether solution is then filtered through 100 g. of neutral aluminium oxide. The filtrate is concentrated under 11 torr, whereby 5-methyl-10,11-dihydro - 5H - dibenz[b,f] azepin-2-acetonitrile crystallises out. This crude product is crystallised from ether, M.P. 70–71°.

In an analogous manner is obtained 5-ethyl-10,11-dihydro-5H-dibenz[b,f]azepin-2-acetonitrile (M.P. 77–78° from cyclohexane), starting with 34.8 g., of 2-chloromethyl-5-ethyl-10,11-dihydro-5H-dibenz[b,f]azepine.

(e) 5-methyl-10,11-dihydro - 5H-dibenz[b,f]azepin-2-acetic acid.—To a solution of 75 g. of potassium hydroxide in 500 ml. of n-butanol are added 16 g. of 5-methyl-10,11-dihydro - 5H - dibenz[b,f]azepin-2-acetonitrile. The mixture is refluxed for 2 hours, cooled, and concentrated, at a bath temperature of 60°, under 0.01 torr to dryness. The residue is dissolved in 1500 ml. of water; the aqueous solution is extracted three times using each time 300 ml. of ether, separated, and acidified at 5° with 2 N hydrochloric acid. The precipitated oil is extracted with ether. The ether solution is separated, washed with water, dried with magnesium sulphate, and concentrated under 11 torr to dryness. The residue is crystallised from ether/petroleum ether. The 5-methyl-10,11-dihydro-5H-dibenz[b,f]azepin-2-acetic acid melts at 121–123°.

In an analogous manner is obtained 5-ethyl-10,11-dihydro-5H-dibenz[b,f]azepin-2-acetic acid, M.P. 113–115° (from ether/petroleum ether), starting with 16.9 g. of 5-ethyl-10,11-dihydro-5H - dibenz[b,f]azepin - 2-acetonitrile.

(f) 5-methyl-10,11-dihydro - 5H-dibenz[b,f]azepin-2-ethanol.—2.82 g. of lithium aluminium hydride are suspended in 60 ml. of abs. tetrahydrofuran and, with stirring, cooled to 5°. To the suspension is slowly added dropwise, under nitrogen and with external cooling with an ice bath, a solution of 10.0 g. of 5-methyl-10,11-dihydro-5H-dibenz[b,f]azepin-2-acetic acid in 60 ml. of abs. tetrahydrofuran. The mixture is subsequently stirred for one hour at room temperature. To the solution, cooled to 0°, are added, with stirring, 2.8 ml. of water, 2.8 ml. of 15% sodium hydroxide solution, and 8.4 ml. of water. The precipitate is filtered off, and the filter residue afterwards thoroughly washed with ether. The filtrate is concentrated by evaporation under 11 torr at 40° to dryness. The residue is distilled in high vacuum. The 5-methyl-10,11 - dihydro-5H - dibenz[b,f]azepin-2-ethanol boils at 155°/0.001 torr and melts, after crystallisation from ether/petroleum ether, at 66–68°.

In an analogous manner is obtained 5-ethyl-10,11-dihydro-5H-dibenz[b,f]azepin-2-ethanol (B.P. 150°/0.001 torr), starting with 10.5 g. of 5-ethyl-10,11-dihydro-5H-dibenz[b,f]azepin-2-acetic acid.

In an analogous manner is obtained 10,11-dihydro-5H-dibenz[b,f]azepin-2-ethanol (M.P. 107–109° ether/petrolether), starting with 10,11-dihydro-5H-dibenz[b,f]azepin-2-acetic acid (M.P. 77–79°) obtained according to Example 10a.

(g) 2-(2 chloroethyl)-5-methyl - 5 - methyl-10,11-dihydro-5H-dibenz[b,f]azepine.—A solution of 6.0 g. of 5-methyl-10,11-dihydro-5H-dibenz[b,f]azepin-2-ethanol in 180 ml. of abs. benzene is heated under nitrogen to 50°. To the solution are added 0.6 ml. of abs. pyridine, and, whilst good stirring is maintained, a solution of 3.25 g. of thionyl chloride and 20 ml. of abs. benzene is added dropwise. The mixture is subsequently stirred for 30 minutes at 60°, cooled and filtered. The filtrate is concentrated by evaporation under 11 torr at 40° to dryness; the residue is then dissolved in 50 ml. of ether. The ether solution is washed with 20 ml. of 1 N sodium bicarbonate solution, and with 20 ml. of water, dried over sodium sulphate, and concentrated under 11 torr to dryness. The 2-(2-chloroethyl)-5-methyl-10,11-dihydro-5H-dibenz[b,f]azepin remains behind as oil.

In an analogous manner is obtained 2-(2-chloroethyl)-5-ethyl-10,11-dihydro-5H-dibenz[b,f]azepin as oil, starting with 6.36 g. of 5-ethyl-10,11-dihydro-5H-dibenz[b,f]azepin-2-ethanol.

In an analogous manner is obtained 2-(2-chloroethyl)-10,11-dihydro-5H-dibenz[b,f]azepine (oil), starting with 10,11-dihydro-5H-dibenz[b,f]azepine-2-ethanol.

(h) 10,11-dihydro - 5-methyl-2 - [2-(methylamino)-ethyl]-5H-dibenz[b,f]azepine hydrochloride.—A mixture of 5.0 g. of 2-(2-chloroethyl)-5-methyl-10,11-dihydro-5H-dibenz[b,f]azepine, 70 ml. of methylamine and 100 ml. of abs. benzene is heated in a steel autoclave for 15 hours to 100°. The mixture is then cooled and concentrated to dryness under 11 torr at 40°. To the residue are added 10 ml. of water and 100 ml. of ether. The ether solution is separated and extracted with 20 ml. of water, as well as with 20 ml. of 2 N hydrochloric acid. The hydrochloric acid extract is separated, washed with ether, and subsequently rendered alkaline at 5° with 2 N sodium hydroxide solution. The precipitated oil is extracted with ether; the ether extract is washed with water, dried over magnesium sulphate, and concentrated under 11 torr to dryness. The residue is dissolved in 30 ml. of methanol; 20 ml. of 1 N hydrochloric acid are added, and the solution is concentrated under 11 torr at 40° to dryness. To the residue are added 30 ml. of abs. benzene, and the whole is again concentrated by evaporation to dryness. The residue is crystallised from methanol/ether, whereby 10,11-dihydro-5-methyl-2-[2-(methylamino)-ethyl]-5H-dibenz[b,f]azepine hydrochloride, M.P. 172–174°, is obtained.

In an analogous manner is obtained, using 70 ml. of dimethylamine: 10,11-dihydro - 5-methyl-2-[2-(dimethylamino)-ethyl]-5H-dibenz[b,f]azepine hydrochloride hydrate, M.P. 202–204° (sublimed at 110°/0.001 torr); and using 70 ml. of diethylamine is obtained: 2-[2-(diethylamino)-ethyl]-10,11-dihydro-5 - methyl-5H-dibenz[b,f]azepine hydrochloride.

Example 2

2 - (2-aminoethyl)-10,11-dihydro-5-methyl-5H-dibenz[b,f]azepine hydrochloride.—A mixture of 2.0 g. of 2-(2-chloroethyl) - 5 - methyl-10,11-dihydro - 5H - dibenz[b,f]azepine, 10 ml. of ammonia and 10 ml. of benzene is heated in an autoclave for 20 hours to 100°, whereby a pressure of 50 atm. is produced. The mixture is then cooled, and concentrated under 11 torr at 40° to dryness. To the residue are added 10 ml. of water and 50 ml. of ether; the ether solution is separated and extracted with 10 ml. of water, and with 50 ml. of 2 N hydrochloric acid. The acidified solution is filtered, and made alkaline with conc. sodium hydroxide solution. The solution is extracted with ether, the ether extracts washed with water, dried over magnesium sulphate, and concentrated to dryness under 11 torr. The residue (1.5 g.) is dissolved in 30 ml. of ether, ethereal hydrochloric acid is added, the precipitated crystals are filtered off, and then crystallised from methanol/ether. 2-(2-aminoethyl)-10,11-dihydro-5-methyl-5H-dibenz[b,f]azepine hydrochloride melts at 209–211°.

In an analogous manner is obtained 2-(2-aminoethyl)-5 - ethyl-10,11-dihydro-5H-dibenz[b,f]azepine hydrochloride (M.P. 172–176° from methanol/ether), starting with 2 - (2-chloroethyl)-5-ethyl-10,11-dihydro-5H-dibenz[b,f]azepine.

In an analogous manner is obtained 2-(2-aminoethyl)-10,11-dihydro - 5H - dibenz[b,f]azepine (B.P. 175–180/0.001 torr; hemifumarate M.P. 231–232°), starting with 2-(2-chloroethyl)-10,11-dihydro-5H-dibenz[b,f]azepine.

Example 3

(a) 5 - methyl-10,11-dihydro-5H-dibenz[b,f]azepin-2-acetamide.—To a solution of 5 g. of 5-methyl-10,11-dihydro-5H-dibenz[b,f]azepin-2-acetonitrile [M.P. 70–71°, cp. Example 1(a) to (d)] in 50 ml. of acetone and 10 ml. of water are added at 20° 6 ml. of 30% aqueous hydrogen peroxide solution, and then 2 ml. of 2 N sodium hydroxide solution. The reaction solution is heated for 20 minutes to 50°, whereby oxygen is evolved. A further 6 ml. of 30% hydrogen peroxide solution and then 2 ml. of 2 N sodium hydroxide solution are added; and the solution is heated for a further 4 hours to 50°. The reaction solution is thereupon concentrated to dryness under 11 torr at 50°; the residue is then dissolved in methanol. The methanolic solution is boiled up with active charcoal and filtered. The filtrate is concentrated under 11 torr, whereby 5 - methyl-10,11-dihydro-5H-dibenz[b,f]azepin-2-acetamide crystallises out, M.P. 140–142°.

In an analogous manner is obtained 5-ethyl-10,11-dihydro-5H-dibenz[b,f]azepin-2-acetamide, M.P. 129–131° (from ethyl acetate), starting with 26.24 g. of 5-ethyl-10,11-dihydro-5H-dibenz[b,f]azepin-2-acetonitrile (M.P. 77–78° from cyclohexane).

(b) 2-(2-aminoethyl)-10,11-dihydro - 5 - methyl-5H-dibenz[b,f]azepine hydrochloride.—18.6 g. of 5-methyl-10,11-dihydro-5H-dibenz[b,f]azepin-2-acetamide are dissolved in 930 ml. of freshly distilled abs. tetrahydrofuran. In the course of one hour at 8–12°, diborane is introduced; this is produced from 45.3 g. of sodium borohydride and 250.0 g. of boron trifluoride-etherate in 1400 ml. of diethylene glycol dimethyl ether according to Organic Reactions 13, 31 (1963). The solution is refluxed for 30 minutes, and cooled to 5°; to the solution are then added dropwise 40 ml. of 6 N hydrochloric acid. The mixture is afterwards concentrated to dryness under 11 torr at 50°; to the residue are added 200 ml. of water, the aqueous suspension is extracted with 100 ml. of ether, separated, and filtered through Hyflo. The filtrate is made alkaline with concentrated sodium hydroxide solution. The precipitated oil is extracted with ether; the ether solution is then washed with water until neutral, dried over magnesium sulphate, and concentrated to dryness under 11 torr at 40°. The residue is dissolved in 100 ml. of methanol; to the solution are added 50 ml. of 1 N hydrochloric acid, and the solution is concentrated to dryness under 11 torr. To the residue are added 100 ml. of abs. benzene, and the solution is again concentrated to dryness under 11 torr at 40°. After crystallisation from methanol/ether, the 2-(2-aminoethyl)-10,11-dihydro-5-methyl - 5H-dibenz[b,f]azepine hydrochloride melts at 209–211°.

In an analogous manner is obtained 2-(2-aminoethyl)-5 - ethyl-10,11-dihydro-5H-dibenz[b,f]azepine hydrochloride (M.P. 172–176° from methanol/ether), starting with 19.5 g. of 5-ethyl-10,11-dihydro-5H-dibenz[b,f]azepin-2-acetamide (M.P. 129–130° from ethyl acetate).

Example 4

(a) 5-methyl - 10,11 - dihydro-5H-dibenz[b,f]azepin-2-ethyl acetate.—A solution of 32.0 g. of 5-methyl-10,11-dihydro-5H-dibenz[b,f]azepin - 2 - acetic acid [M.P. 121–123°, cp. Example 1(a) to (e)] in 120 ml. of 1 N sodium hydroxide solution is concentrated to dryness under 11 torr at 50°. To the residue are added 100 ml. of abs. benzene, and the solution is again concentrated under 11 torr at 50° to dryness. The residue is dissolved in 350 ml. of abs. dimethylformamide; and to the solution are added at 40° 18.5 g. of diethyl sulphate. A further 5 g. of diethyl sulphate are added after 15 minutes; the mixture is then stirred for 30 minutes at 40°, and is afterwards poured into ice water. The precipitated oil is extracted with ether; the ether solution is extracted with 1 N sodium carbonate solution, and then with water; it is separated, dried over magnesium sulphate, and concentrated under 11 torr at 40°. The residue is distilled in high vacuum. The 5-methyl-10,11-dihydro-5H-dibenz[b,f]azepin - 2 - ethyl acetate boils at 170°/0.001 torr.

In an analogous manner is obtained 5-ethyl-10,11-dihydro-5H-dibenz[b,f]azepin - 2 - ethyl acetate, B.P. 175°/0.001 torr, from 33.8 g. of 5-ethyl-10,11-dihydro-5H-dibenz[b,f]azepin-2-acetic acid [M.P. 113–115° from ether/petroleum ether, cp. Example 1(a) to (e)].

(b) N,5-dimethyl-10,11-dihydro-5H-dibenz[b,f]azepin-2-acetamide.—A mixture of 20.0 g. of 5-methyl-10,11-dihydro - 5H-dibenz[b,f]azepin-2-ethyl acetate, 50 ml. of abs. methylamine and 5 ml. of methanol is stirred for 5 days at room temperature in a steel autoclave. The mixture is then concentrated by evaporation to dryness. The residue is dissolved in 100 ml. of chloroform; the chloroform solution is then extracted with 30 ml. of water, 30 ml. of 2 N hydrochloric acid, and twice with 20 ml. of water each time; it is afterwards dried over sodium sulphate and concentrated under 11 torr at 40° to dryness. The residue is crystallised from ether/petroleum ether. The N,5 - dimethyl-10,11-dihydro-5H-dibenz[b,f]azepin-2-acetamide melts at 129–131°.

In an analogous manner is obtained, starting with 21.0 g. of 5-ethyl-10,11-dihydro-5H-dibenz[b,f]azepin-2-ethyl acetate: N-methyl - 5-ethyl-10,11-dihydro-5H-dibenz[b,f]azepin-2-acetamide.

(c) Analogously to Example 3(b) are obtained: 10,11-dihydro - 5-methyl-2-[2-(methylamino)-ethyl]-5H-dibenz[b,f]azepine hydrochloride (M.P. 172–174° from methanol/ether), starting with 19.5 g. of N,5-dimethyl-10,11-dihydro - 5H-dibenz[b,f]azepin-2-acetamide; and: 10,11-dihydro - 5 - ethyl - 2-[2-(methylamino)-ethyl-5H-dibenz[b,f]azepine hydrochloride, starting with 20.5 g. of N-methyl - 5 - ethyl-10,11-dihydro-5H-dibenz[b,f]azepin-2-acetamide.

Example 5

(a) 5 - benzyl-10,11-dihydro-5H-dibenz[b,f]azepine-2-carboxaldehyde.—To 120 ml. of dimethylformamide are added dropwise at 10°, within 10 minutes, 61 g. of distilled phosphorus oxychloride. The whole is cooled to 0°, and within one hour is added dropwise, with thorough stirring and at 10° at the most, a solution of 38 g. of 5-benzyl - 10,11-dihydro-5H-dibenz[b,f]azepine (B.P. 178–181°/0.15 torr, M.P. 66–68° from ethanol, produced by condensation of 10,11 - dihydro-5H-dibenz[b,f]azepine with benzyl chloride by means of sodium amide in boiling toluene) in 60 ml. of dimethylformamide. The reaction mixture is thereupon stirred for one hour at 70–75°. The dark-orange mixture is cooled and poured on to 500 g. of ice, whereby the crude aldehyde precipitates as resin. The formed suspension is adjusted with concentrated sodium carbonate solution to pH 7, and then extracted with chloroform. The chloroform solution is washed with water, dried over calcium chloride, and concentrated in vacuo. The resin remaining behind is dissolved, with heating, in 350 ml. of cyclohexane. The 5-benzyl-10,11-dihydro - 5H-dibenz[b,f]azepine-2-carboxaldehyde, crystallising on cooling, is filtered off under suction; its melting point is 99.5–101°.

(b) 5 - benzyl-10,11-dihydro-5H-dibenz[b,f]azepine-2-methanol.—11.7 g. of lithium aluminium hydride are suspended in 250 ml. of absolute ether; the suspension is then cooled, whilst being stirred, to 5°. To the suspension is slowly added dropwise, under nitrogen and with external cooling with an ice bath, a solution of 50 g. of 5 - benzyl-10,11-dihydro-5H-dibenz[b,f]azepine-2-carboxaldehyde in 600 ml. of abs. ether and 150 ml. of abs. tetrahydrofuran. The mixture is subsequently stirred for 18 hours at room temperature. To the mixture, cooled to 5°, are added dropwise, with stirring, 12 ml. of water, 12 ml. of 15% sodium hydroxide solution, and a further 36 ml. of water. The mixture is stirred for 2 hours at room temperature, and is then filtered. The filtrate is concentrated under 11 torr at 40°, and the residue distilled. By this means is obtained 5-benzyl-10,11-dihydro-5H-dibenz[b,f]azepine - 2-methanol as yellow oil, B.P. 190–200°/0.01 torr.

(c) 2 - chloromethyl-5-benzyl-10,11-dihydro-5H-dibenz[b,f]azepine.—A solution of 1.6 g. of 5-benzyl-10,11-dihydro - 5H-dibenz[b,f]azepine-2-methanol in 20 ml. of abs. ether and 2 ml. of abs. pyridine is quickly added dropwise to a solution (cooled to 0°) of 2 ml. of thionyl chloride and 2 ml. of pentane. The mixture is afterwards stirred for one hour at 0°, and then diluted with 10 ml. of pentane. The mixture is extracted at 5°, twice in each case, with 10 ml. of 1 N hydrochloric acid, 10 ml. of 1 N sodium hydroxide solution, and 10 ml. of water; it is then dried over potassium carbonate, and concentrated under 11 torr at 40° to dryness. The 2-chloromethyl-5-benzyl-10,11-dihydro-5H-dibenz[b,f]azepine is obtained as yellow oil.

(d) 5 - benzyl-10,11-dihydro-5H-dibenz[b,f]azepin-2-acetonitrile.—To a suspension of 2.5 g. of sodium cyanide in 30 ml. of dimethyl sulphoxide is added at 40°, with stirring, a solution of 5 g. of 2-chloromethyl-5-benzyl-10,11-dihydro-5H-dibenz[b,f]azepine in 20 ml. of dimethyl sulphoxide. The mixture is then stirred for 15 hours at 40°, and diluted with 400 ml. of ice water. The solution is extracted four times with 200 ml. of ethyl acetate; the ethyl acetate solutions are washed with 150 ml. of 6 N hydrochloric acid, and afterwards with 50 ml. of water; they are then dried with magnesium sulphate, and concentrated under 11 torr at 40°. The residue is recrystallised from ether, whereby 5 - benzyl-10,11-dihydro-5H-dibenz[b,f]azepin-2-acetonitrile is obtained, M.P. 96–98°.

(e) 10,11 - dihydro - 5H-dibenz[b,f]azepin-2-acetonitrile.—An amount of 7.2 g. of 5-benzyl-10,11-dihydro-5H-dibenz[b,f]azepin-2-acetonitrile is dissolved in 100 ml. of ethyl acetate; and the solution, after the addition of 4 drops of perchloric acid and 0.75 g. of palladium charcoal catalyst (10% Pd), is then hydrogenated at room temperature and normal pressure. Hydrogenation is complete after one hour. After filtration, the filtrate is washed with 30 ml. of water, and with 30 ml. of saturated sodium chloride solution; it is afterwards dried over magnesium sulphate, and concentrated under 11 torr at 40° to dryness. The residue is crystallised from ethyl acetate/ether. The obtained 10,11-dihydro-5H-dibenz[b,f]azepin-2-acetonitrile melts at 100–102°.

(f) 5 - formyl - 10,11 - dihydro - 5H - dibenz[b,f]azepin-2-acetonitrile.—A mixture of 11.9 ml. of formic acid and 24.9 ml. of acetic anhydride is stirred for 20 minutes at 40°. To the mixture are then added in portions 3.5 g. of 10,11 - dihydro - 5H-dibenz[b,f]azepin-2-acetonitrile, and the mixture is stirred for 45 minutes at 40°. The solution is then poured, whilst stirring is maintained, into 1000 ml. of warm water (40°); stirring proceeds for 20 minutes, and the solution is then cooled to room temperature. The formed suspension is extracted three times using each time 200 ml. of ethyl acetate; the ethyl acetate solutions are then washed with 60 ml. of 2 N potassium hydrogen carbonate solution, and subsequently with water, dried over sodium sulphate, and concentrated under 11 torr at 40°. The residue is chromatographed on 300 g. of silica gel. The fractions 5–10, eluted in each case with 200 ml. of benzene/chloroform/ethyl acetate (4:4:2), contain 5 - formyl - 10,11-dihydro-5H - dibenz[b,f]azepin - 2 - acetonitrile, M.P. 99–101° from ethyl acetate/ether.

(g) 5 - formyl - 10,11 - dihydro-5H-dibenz[b,f]azepin-2-ethyl acetate.—A solution of 3.4 g. of 5-formyl-10,11-dihydro-5H-dibenz[b,f]azepin - 2 - acetonitrile in 70 ml. of abs. ether and 50 ml. of abs. ethanol is cooled, with stirring and the exclusion of moisture, to 0–5°. Anhydrous hydrogen chloride is fed into the solution during the course of 4 hours. The solution is allowed to stand for 2 hours at room temperature, and is then concentrated under 11 torr at 40° to dryness. The residue is dissolved in 30 ml. of water, the solution covered with 40 ml. of ether, and the whole refluxed for 2 hours on the steam bath. The solution is then cooled, the ether phase separated, and the aqueous phase extracted with a further 40 ml. of ether. The combined ether solutions are dried over sodium sulphate, and concentrated under 11 torr at 40°. The residue is chromatographed on 100 g. of silica gel. The fractions 5–9, eluted with benzene/chloroform/ethyl acetate (4:4:2), contain 5-formyl-10,11 - dihydro - 5H-dibenz[b,f]azepin - 2 - ethyl acetate. The fractions are combined and distilled; B.P. 200°/0.001 torr.

(h) N-methyl - 10,11 - dihydro-5H-dibenz[b,f]azepin-2 - acetamide.—A mixture of 2.0 g. of 5-formyl-10,11-dihydro - 5H - dibenz[b,f]azepin - 2 - ethyl acetate, 25 ml. of abs. methylamine and 0.5 ml. of methanol is allowed to stand for 24 hours at room temperature in a steel autoclave. The mixture is then concentrated to dryness. The residue is dissolved in 60 ml. of chloroform; the chloroform solution is washed with water, dried over sodium sulphate, and concentrated under 11 torr at 40°. The residue is dissolved in 20 ml. of ethyl acetate. With the addition of petroleum ether, N-methyl-10,11-dihydro-5H-dibenz[b,f]azepin - 2 - acetamide, M.P. 57–58°, crystallises out.

In an analogous manner is obtained 10,11 - dihydro-5H - dibenz[b,f]azepin - 2 - acetamide (M.P. 245–250° from ethanol) starting with 5 - formyl - 10,11-dihydro-5H - dibenz[b,f]azepin - 2 - acetic acid ethyl ester and ammonia.

(i) 10,11 - dihydro - 2 - [2 - (methylamino)-ethyl]-5H - dibenz[b,f]azepine hydrochloride.—0.9 g. of N-methyl - 10,11 - dihydro - 5H - dibenz[b,f]azepin-2-acetamide are dissolved in 75 ml. of freshly distilled abs. tetrahydrofuran. Within one hour at 8–12°, diborane is introduced; this is produced from 3.72 g. of sodium borohydride and 20.7 g. of borotrifluoride etherate in 120 ml. of diethylene glycol dimethyl ether according to Organic Reactions 13, 31 (1963). The solution is refluxed for 30 minutes, cooled to 5°, and to the solution are added dropwise 4 ml. of 6 N hydrochloric acid. The mixture is then concentrated to dryness under 11 torr at 50°. To the residue are added 20 ml. of water; the aqueous suspension is extracted with 10 ml. of ether, separated, and filtered through Hyflo (purified diatomaceous earth). The filtrate is made alkaline with 2 N sodium hydroxide solution; the suspension is then extracted with ether, the ether solution washed with water, dried over magnesium sulphate, and concentrated to dryness under 11 torr at 40°. The residue is dissolved in 10 ml. of methanol, 3 ml. of 1 N hydrochloric acid are added, and the solution is concentrated to dryness under 11 torr at 50°. The residue is dried by means of azeotropic distillation with anhydrous benzene. The residue is crystallised from methanol/ether. The obtained 10,11 - dihydro - 2 - [2-(methylamino)-ethyl] - 5H - dibenz[b,f]azepine hydrochloride melts at 220–225°.

In an analogous manner is obtained 2 - (2 - aminoethyl) - 10,11 - dihydro - 5H - dibenz[b,f]azepin (B.P. 175–180°/0.001 torr) starting from 10,11 - dihydro-5H-dibenz[b,f]azepin-2-acetamide.

Example 6

(a) 2 - (2 - formamido-ethyl) - 5 - methyl-10,11-dihydro-5H-dibenz[b,f]azepine.—A mixture of 6 ml. of formic acid and 12 ml. of acetic anhydride is stirred for one hour at 40°; it is then added to 2.0 g. of 2-(2-aminoethyl) - 5 - methyl - 10,11 - dihydro-5H-dibenz[b,f]azepine (liberated from the hydrochloride produced according to Example 3, M.P. 209–211° from methanol/ether). The mixture is stirred for 3 hours at 40°. The solution is then poured, with stirring, into 100 ml. of warm water (40°); the solution is stirred for 20 minutes, and cooled to room temperature. The formed suspension is extracted with ether, the ether washed with water, dried over sodium sulphate, and concentrated under 11 torr. The 2 - (2 - formamido-ethyl) - 5 - methyl - 10,11-dihydro - 5H - dibenz[b,f]azepine remains behind as oil.

(b) 10,11 - dihydro - 5 - methyl - 2-[2-(methylamino)-ethyl] - 5H - dibenz[b,f]azepine hydrochloride.—An amount of 0.45 g. of lithium aluminium hydride is suspended in 20 ml. of abs. tetrahydrofuran, and the suspension cooled, whilst being stirred, to 5°. To this is added dropwise, under nitrogen and with external cooling using an ice bath, a solution of 1.3 g. of 2-(2-formamido-ethyl) - 5 - methyl-10,11-dihydro-5H-dibenz[b,f]azepine in 10 ml. of abs. tetrahydrofuran. The mixture is subsequently stirred for one hour at room temperature. To the mixture, cooled to 5°, are added, whilst stirring is maintained, 0.5 ml. of water, 0.5 ml. of 15% sodium hydroxide solution, and a further 1.5 ml. of water. The filtrate is filtered, and then concentrated under 11 torr at 40°. The residue is dissolved in 30 ml. of methanol; to the solution are added 3 ml. of 1 N hydrochloric acid, and the solution is concentrated to dryness under 11 torr at 40°. The residue is dried by azeotropic distillation with anhydrous benzene. The residue is crystallised from methanol/ether. The 10,11 - dihydro-5 - methyl - 2 - [2 - methylamino)-ethyl]-5H-dibenz-[b,f]azepine hydrochloride melts at 172–174°.

Example 7

(a) 2 - [2 - (N-methyl-formamido)ethyl]-5-methyl-10,11-dihydro-5H-dibenz[b,f]azepine.—A solution of 3.0 g. of 10,11 - dihydro - 5-methyl-2-[2-(methylamino)-ethyl]-5H-dibenz[b,f]azepine (liberated from the hydrochloride produced according to Example 6, M.P. 172–174° from methanol/ether) in 5 ml. of formic acid ethyl ester is stirred for 20 hours at room temperature. The mixture is thereupon concentrated under 11 torr at 50°. The residue is dissolved in 50 ml. of ethyl acetate; the ethyl acetate solution is then washed with 10 ml. of 2 N hydrochloric acid, and with water, dried over sodium sulphate, shaken with 10 g. of Florosil (trade name of the firm Fluka for magnesia/silica gel) at room temperature, filtered, and concentrated under 11 torr. The 2-[2-(N-methyl-formamido) - ethyl] - 5-methyl-10,11-dihydro-5H-dibenz[b,f]azepine is obtained as oil.

(b) 10,11 - dihydro - 5 - methyl-2-[2-(dimethylamino)-ethyl]-5H-dibenz[b,f]azepine hydrochloride hydrate, M.P. 202–204° (from methanol/ether), is obtained analogously to Example 6(b) from 1.9 g. of 2-[2-(N-methyl-formamido) - ethyl] - 5-methyl-10,11-dihydro-5H-dibenz[b,f]azepine.

Example 8

2 - (2 - aminoethyl)-10,11-dihydro-5-methyl-5H-dibenz[b,f]azepine hydrochloride.—A mixture of 4.97 g. of 5 - methyl-10,11-dihydro-5H-dibenz[b,f]azepin-2-acetonitrile [see Example 1(a) to (d)], 2 g. of Raney nickel, and 50 ml. of methanol solution saturated with ammonia gas, is hydrogenated at 80–90° under 151 atm. pressure. Hydrogenation ceases after 7 hours. The catalyst is filtered off, and afterwards washed with methanol. The filtrate is concentrated to dryness under 11 torr at 40°. To the residue are added 10 ml. of 2 N sodium hydroxide solution, and the mixture is extracted with 200 ml. of ether. The ether solution is separated, and extracted with 30 ml. of water, then twice with 15 ml. of 2 N hydrochloric acid each time, and again with water. The two hydrochloric acid solutions are extracted with ether, combined, and rendered alkaline with 2 N sodium hydroxide solution. The precipitated oil is extracted with 50 ml. of ether. The obtained ethereal solution of 2-(2-aminoethyl)-10,11-dihydro-5-methyl-5H-dibenz[b,f]azepine is washed with water, and dried over sodium sulphate; an amount of 15 ml. of 2 N ethereal hydrochloric acid is then added whilst stirring is maintained. The 2-(2-aminoethyl)-10,11 - dihydro-5-methyl-5H-dibenz[b,f]azepine hydrochloride crystallises out. Recrystallised from methanol/ether, the salt melts at 209–211°.

In an analogous manner is obtained 2-(2-aminoethyl)-10,11 - dihydro-5H-dibenz[b,f]azepine (B.P. 175–180°/0.001 torr; hemifumarate thereof melts at 231–232°) starting from 10,11-dihydro-5H-dibenz[b,f]azepin-2-acetonitrile (M.P. 100–102°).

The reduction can also be carried out in the following manner:

2 - (2 - aminoethyl)-10,11-dihydro-5H-dibenz[b,f]azepine hemifumarate (2:1).—An amount of 4.5 g. of 10,11-dihydro-5H-dibenz[b,f]azepin-2-acetonitrile (M.P. 100–102° from ethyl acetate/ether) is dissolved in 250 ml. of freshly distilled abs. tetrahydrofuran. Diborane is fed in at 0–5° during one hour; the diborane is produced from 12.5 g. of sodium borohydride and 69.4 g. of boron trifluoride etherate in 400 ml. of diethylene glycol dimethyl ether according to Organic Reactions 13, (1963). The solution is refluxed for 30 minutes, and cooled to 5°; to the solution are then added dropwise 8.5 ml. of 6 N hydrochloric acid. The mixture is then concentrated to dryness under 11 torr at 50°. To the residue are added 40 ml. of 2 N sodium hydroxide solution and 100 ml. of ethyl acetate. The organic phase is separated, washed three times with 20 ml. of water each time, and shaken with 150 ml. of 2 N hydrochloric acid. White crystals are thereby precipitated; they are filtered off under suction and suspended in 10 ml. of 6 N sodium hydroxide solution. The precipitated oil is extracted with 100 ml. of ethyl acetate; the ethyl acetate solution is dried over sodium sulphate, and concentrated under 11 torr at 40°. The evaporation residue (4.0 g. of colourless oil) is dissolved in 40 ml. of methanol, and to the solution is added a solution of 0.97 g. of fumaric acid in 50 ml. of methanol. 2 - (2 - aminoethyl)-10,11-dihydro-5H-dibenz[b,f]azepine hemifumarate (2:1) thereby crystallises out. Recrystallised from methanol/ether, it melts at 231–232°.

In an analogous manner is obtained, starting with 5 - methyl - 10,11-dihydro-5H-dibenz[b,f]azepin-2-acetonitrile, 2 - (2-aminoethyl)-10,11-dihydro-5-methyl-5H-dibenz[b,f]azepine hydrochloride (M.P. 209–211°).

The 10,11-dihydro-5H-dibenz[b,f]azepin-2-acetonitrile used as starting material is obtained as follows:

(a) 5 - benzyl-10,11-dihydro-5H-dibenz[b,f]azepine-2-carboxaldehyde.—To 120 ml. of dimethylformamide are added dropwise at 10°, within 10 minutes, 61 g. of distilled phosphorus oxychloride. The whole is then cooled to 0° and to it is added within one hour, with good stirring and at a temperature not exceeding 10°, a solution of 38 g. of 5 - benzyl-10,11-dihydro-5H-dibenz[b,f]azepine (B.P. 178–181°/0.15 torr, M.P. 66–68° from ethanol, produced by condensation of 10,11-dihydro-5H-dibenz[b,f]azepine with benzyl chloride by means of sodium amide in boiling toluene) in 60 ml. of dimethylformamide. The reaction mixture is thereupon stirred for one hour at 70–75°. The dark-orange mixture is cooled, and poured on to 500 g. of ice, whereby the crude aldehyde precipitates as resin. The formed suspension is adjusted to pH 7 by means of conc. sodium carbonate solution, and then extracted with chloroform. The chloroform solution is washed with water, dried over calcium chloride, and concentrated in vacuo. The resin remaining behind is dissolved, with heating, in 350 ml. of cyclohexane. The 5-benzyl-10,11-dihydro-5H-dibenz[b,f]azepine-2-carboxaldehyde crystallising on cooling is filtered off under suction, M.P. 99.5–101°.

(b) 5-benzyl-10,11-dihydro - 5H - dibenz[b,f]azepine-2-methanol.—An amount of 11.7 g. of lithium aluminium hydride is suspended in 250 ml. of abs. ether, and, whilst being stirred, cooled to 5°. To the suspension is then added slowly dropwise, under nitrogen and with external cooling using an ice-bath, a solution of 50 g. of 5-benzyl-10,11-dihydro-5H-dibenz[b,f]azepine-2-carboxaldehyde in 600 ml. of abs. ether and 150 ml. of abs. tetrahydrofuran. The mixture is subsequently stirred at room temperature for 18 hours. To the mixture (cooled to 5°) are added dropwise, with stirring 12 ml. of water, 12 ml. of 15% sodium hydroxide solution, and a further 36 ml. of water. The whole is stirred for 2 hours at room temperature, and is then filtered off. The filtrate is concentrated under 11 torr at 40°, and the residue distilled. By this means is obtained 5 - benzyl-10,11-dihydro-5H-dibenz[b,f]azepine-2-methanol as yellow oil, B.P. 190–200° C./0.01 torr.

(c) 2-chloromethyl - 5 - benzyl-10,11-dihydro-5H-dibenz[b,f]azepine.—A solution of 1.6 g. of 5-benzyl-10,11-dihydro-5H-dibenz[b,f]azepine-2-methanol in 20 ml. of abs. ether and 2 ml. of abs. pyridine is quickly added dropwise to a solution (cooled to 0°) of 2 ml. of thionyl chloride and 2 ml. of pentane. The mixture is afterwards stirred for one hour at 0°, and then diluted with 10 ml. of pentane. The mixture is extracted at 5°, twice in each case, with 10 ml. of 1 N hydrochloric acid, 10 ml. of 1 N sodium hydroxide solution, and 10 ml. of water; it is then dried over potassium carbonate, and concentrated to dryness under 11 torr at 40°. 2-chloromethyl-5-benzyl-10,11-dihydro-5H-dibenz[b,f]azepine is obtained as yellow oil.

(d) 5-benzyl - 10,11 - dihydro - 5H - dibenz[b,f]azepin-2-acetonitrile.—To a suspension of 2.5 g. of sodium cyanide in 30 ml. of dimethylsulphoxide is added at 40°, with stirring, a solution of 5 g. of 2-chloromethyl-5-benzyl-10,11-dihydro-5H-dibenz[b,f]azepine in 20 ml. of dimethylsulphoxide. The mixture is then stirred for 15 hours at 40°, and diluted with 400 ml. of ice water. The solution is extracted four times with 200 ml. of ethyl acetate; the ethyl acetate solutions are washed with 150 ml. of 6 N hydrochloric acid, and then with 50 ml. of water; they are subsequently dried over magnesium sulphate, and concentrated under 11 torr at 40°. The residue is recrystallized from ether, whereby 5-benzyl-10,11-dihydro-5H-dibenz[b,f]azepin-2-acetonitrile is obtained, M.P. 96–98°.

(e) 10,11-dihydro - 5H - dibenz[b,f]azepin - 2 - acetonitrile.—An amount of 7.2 g. of 5-benzyl-10,11-dihydro-5H-dibenz[b,f]azepin-2-acetonitrile is dissolved in 100 ml. of ethyl acetate; and, after addition of 4 drops of perchloric acid and 0.75 g. of palladium charcoal catalyst (10% Pd), the solution is hydrogenated at room temperature and under normal pressure. The hydrogenation is completed after one hour. The solution is filtered, the filtrate washed with 30 ml. of water and 30 ml. of saturated sodium chloride solution, dried over magnesium sulphate, and concentrated under 11 torr at 40° to dryness. The residue is crystallised from ethyl acetate/ether. The 10,11 - dihydro-5H-dibenz[b,f]azepin-2-acetonitrile melts at 100–102°.

Example 9

(a) 2-(2 - aminoethyl) - 5 - benzyl-10,11-dihydro-5H-dibenz[b,f]azepine hydrochloride.—A mixture of 5.0 g. of 5-benzyl-10,11-dihydro - 5H-dibenz[b,f]azepin - 2 - acetonitrile [M.P. 96–98° from ether, cp. Examples 4(a)–(d)], 2 g. of Raney nickel, and 50 ml. of methanol solution saturated with ammonia gas, is hydrogenated at 80–90° under 150 atm. pressure. Hydrogenation ceases after 9 hours. The catalyst is filtered off, and is afterwards washed with methanol. The filtrate is concentrated to dryness under 11 torr at 40°. The residue is dissolved in 100 ml. of ethyl acetate; the ethyl acetate solution is extracted with 20 ml. of 1 N hydrochloric acid, and the hydrochloric acid solution separated, and cooled with an ice bath. 2-(2-aminoethyl) - 5 - benzyl - 10,11 - dihydro-5H-dibenz[b,f]azepine hydrochloride precipitates out in crystalline form. The crystals are filtered off, washed with a little water, and recrystallised from methanol/ether, M.P. 93–94°.

(b) 2-(2-aminoethyl) - 10,11 - dihydro-5H-dibenz[b,f]azepine.—0.9 g. of 2-(2-aminoethyl)-5-benzyl-10,11-dihydro-5H-dibenz[b,f]azepine (liberated from the hydrochloride hydrate) are dissolved in 60 ml. of abs. methanol and after addition of 6 drops of perchloric acid and 0.3 g. of palladium charcoal catalyst (10% Pd), hydrogenated at room temperature and under normal pressure. The hydrogen adsorption is finished after 30 minutes. The catalyst is filtered off, and the filtrate concentrated to dryness under 11 torr. To the residue are added 10 ml. of 1 N sodium hydroxide solution, and the suspension is extracted with 40 ml. of ethyl acetate. The ethyl acetate solution is washed with 10 ml. of water, dried over sodium sulphate, and concentrated under 11 torr. The residue is distilled in high vacuum. The 2-(2-aminoethyl) - 10,11 - dihydro-5H-dibenz[b,f]azepine boils at 175–180°/0.001 torr; the hemifumarate salt of this compound melts at 231–232° (from methanol).

Example 10

(a) 5 - formyl - 10,11 - dihydro-5H-dibenz[b,f]azepin-2-acetic acid.—A solution of 0.95 g. of 5-formyl-10,11-dihydro-5H-dibenz[b,f]azepin-2-ethyl acetate [B.P. 200°/0.001 torr, cp. Example 5(g)] in 15 ml. of ethanol and 3.1 ml. of 1 N sodium hydroxide solution is stirred for 2 hours at room temperature. The reaction solution is then concentrated to dryness under 11 torr at 40°. The residue is dissolved in 20 ml. of water; the aqueous solution is extracted with 30 ml. of ether, separated and acidified with 2 N hydrochloric acid. The suspension is extracted with 30 ml. of ether; the ether solution is then washed with water, dried over magnesium sulfate, and concentrated under 11 torr at 40°. After crystallisation from ethyl acetate/ether, the 5-formyl-10,11 - dihydro - 5H - dibenz[b,f]azepin-2-acetic acid melts at 187–188°.

(b) 5 - formyl - N - methyl - 10,11 - dihydro - 5H-dibenz[b,f]azepin-2-acetamide.—A solution of 0.5 g. of 5-formyl - 10,11 - dihydro - 5H - dibenz[b,f]azepin - 2-acetic acid in 10 ml. of thionyl chloride is allowed to stand for 18 hours, whereby a strong stream of dry nitrogen is passed through the solution. The mixture is subsequently concentrated to dryness under 11 torr at 40°. The residue is dried by means of azeotropic distillation with anhydrous benzene. The crude 5-formyl-10,11-dihydro - 5H - dibenz[b,f]azepin - 2 - acetic acid chloride is dissolved in 40 ml. of abs. benzene to the benzene solution are added 2 ml. of anhydrous methylamine; the mixture is shaken for 10 minutes at room temperature, and is concentrated to dryness under 11 torr at 40°. To the residue are added 10 ml. of water and 30 ml. of ether; the whole is thoroughly shaken and the ether phase separated. The ether solution is washed twice using each time 10 ml. of 2 N sodium carbonate solution, and afterwards with 10 ml. of water; it is dried over magnesium sulphate, and concentrated to dryness under 11 torr at 40°. The residue is crystallised from ethyl acetate/ether. The 5 - formyl - N - methyl - 10,11 - dihydro - 5H-dibenz[b,f]azepin-2-acetamide melts at 137–139°.

In an analogous manner is obtained 5-formyl-10,11-dihydro - 5H - dibenz[b,f]azepin - 2 - acetamide, M.P. 208–210° (from ethyl acetate) by treatment with ammonia instead of methylamine.

(c) 10,11 - dihydro - 5 - methyl - 2 - [2 - (methylamino) - ethyl] - 5H - dibenz[b,f]azepine hydrochloride.—1.2 g. of 5 - formyl - N - methyl - 10,11 - dihydro-5H - dibenz[b,f]azepin - 2 - acetamide are dissolved in 120 ml. of freshly distilled abs. tetrahydrofuran. Within one hour at 8–12°, diborane is introduced; this is produced from 4.9 g. of sodium boron hydride and 28.0 g. of borotrifluoride etherate in 160 ml. of diethylene glycol dimethyl ether according to Organic Reactions 13, 31 (1963). The solution is refluxed for 30 minutes, and cooled to 5°; to the solution are then added dropwise 6 ml. of 6 N hydrochloric acid. The mixture is afterwards concentrated to dryness under 11 torr at 50°; and to the residue are added 30 ml. of water. The aqueous suspension is extracted with 20 ml. of ether, separated, and filtered through Hyflo (purified diatomaceous earth). The filtrate is made alkaline with 2 N sodium hydroxide solution, the suspension extracted with ether, the ether solution washed with water, dried over magnesium sulphate, and concentrated to dryness under 11 torr at 40°. The residue is dissolved in 15 ml. of methanol; to the solution are added 4 ml. of 1 N hydrochloric acid, and the solution is concentrated to dryness under 11 torr at 50°. The residue is dried by means of azeotropic distillation with anhydrous benzene. The residue is crystallised from methanol/ether. The 10,11 - dihydro - 5 - methyl - 2 - [2 - (methylamino) - ethyl] - 5H - dibenz[b,f]azepine hydrochloride melts at 172–174°.

In an analogous manner is obtained 2 - (2 - aminoethyl) - 5 - methyl - 10,11 - dihydro - 5H - dibenz[b,f]azepin hydrochloride M.P. 209–211°, starting with 5-formly - 10,11 - dihydro - 5H - dibenz[b,f]azepin - 2-acetamide (M.P. 208–210°).

The 5 - formyl - 10,11 - dihydro - 5H - dibenz[b,f]azepin-2-ethyl acetate used as starting material for the above described Example 10(a) is obtained also by the following process:

(a₁) 10,11 - dihydro - 5H - dibenz[b,f]azepin - 2 - ethyl acetate.—A solution of 6 g. of 5-benzyl-10,11-dihydro-5H-dibenz[b,f]azepin-2-acetonitrile in 90 ml. of abs. ether and 60 ml. of abs. ethanol is cooled, with stirring and the exclusion of moisture, to 5°. Anhydrous hydrogen chloride is fed for 3 hours into the solution, whereby the temperature is not to exceed 5°. Hydrogen chloride is then fed in for a further 5 hours at room temperature. The solution is afterwards allowed to stand for 15 hours at room temperature; it is then concentrated to dryness under 11 torr at 40° bath temperature. The residue is dissolved in 20 ml. of water; the solution is covered with 40 ml. of ether, and the whole refluxed for 1½ hours on a water-bath. After cooling, the ether phase is separated, and the aqueous solution is extracted with a further 30 ml. of ether. The combined ether solutions are dried over magnesium sulphate, and concentrated under 11 torr at 40°. The residue is crystallised from methanol/ether.

The 10,11 - dihydro - 5H - dibenz[b,f]azepin - 2 - ethyl acetate melts at 77–79°.

(a₂) 5 - formyl - 10,11 - dihydro - 5H - dibenz[b,f]-azepin-2-ethyl acetate.—A mixture of 48.0 ml. of formic acid and 98 ml. of acetic anhydride is stirred for 20 minutes at 40°. To this are added, in portions, 14.0 g. of 10,11 - dihydro - 5H - dibenz[b,f]azepin - 2 - ethyl acetate; and the mixture is stirred for 30 minutes at 40°. The solution is then poured, with stirring, into 2000 ml. of warm water (40°), the whole stirred for 20 minutes and then cooled to room temperature. The obtained suspension is extracted three times with 400 ml. of ether each time; the ether solutions are washed with 100 ml. of potassium hydrogen carbonate solution, and then with water, dried over sodium sulphate, and concentrated under 11 torr at 40°. The residue is chromatographed on 500 g. of silica gel. The fractions 4–10, eluted with benzene:chloroform/ethyl acetate=(4:4:2), contain 5-formyl - 10,11 - dihydro - 5H - dibenz[b,f]azepin - 2-ethyl acetate, M.P. 78–79° (from ether/petroleum ether).

Example 11

(a) 2 - (2 - nitrovinyl - 5 - methyl - 10,11 - dihydro-5H - dibenz[b,f]azepine.—2.37 g. of 5 - methyl - 10,11-dihydro - 5H - dibenz[b,f]azepine - 2 - carboxaldehyde [cp. Example 1(a)], 8.8 ml. of nitromethane, 0.97 g. of ammonium acetate and 10 ml. of benzene are refluxed together for 2.5 hours, whereby the precipitated water is separated using a water-separator. The red solution is then allowed to stand overnight at room temperature, and is afterwards diluted with 30 ml. of benzene. The benzene solution is washed twice using each time 10 ml. of water, dried over magnesium sulphate, and concentrated under 11 torr at 40°. The residue is triturated with ether, whereby 2 - (2 - nitrovinyl) - 5 - methyl - 10,11 - dihydro - 5H-dibenz[b,f]azepine precipitates in crystalline form, M.P. 175–180°.

(b) 2-(2-aminoethyl) - 10,11 - dihydro-5-methyl-5H-dibenz[b,f]azepine hydrochloride.—A solution of 2.5 g. of 2 - (2-nitrovinyl) - 5 - methyl-10,11-dihydro-5H-dibenz[b,f]azepine in 50 ml. of anhydrous tetrahydrofuran is added dropwise at 0–5°, with stirring, to a suspension of 2.5 g. of lithium aluminium hydride in 40 ml. of anhydrous tetrahydrofuran. The mixture is subsequently refluxed for 3 hours, and cooled to 0–5°. To the mixture are added dropwise, with thorough stirring and ice-cooling, 2.5 ml. of water, 2.5 ml. of 15% sodium hydroxide solution, and a further 7.5 ml. of water. The mixture is then filtered off and washed with 30 ml. of tetrahydrofuran. The filtrate is concentrated under 11 torr at 50°. The oily residue is dissolved in ether; the ether solution is then washed with water, then three times with 2 N hydrochloric acid solution, and again with water. The combined aqueous-acid extracts are made alkaline with 2 N sodium hydroxide solution. The precipitated oil is dissolved in ether; the ethereal solution is then concentrated under 11 torr at 40° C. The residue is dissolved in 15 ml. of methanol; to the methanolic solution is added the calculated amount of 1 N hydrochloric acid, and the whole concentrated under 11 torr at 40° to dryness. The residue is recrystallised twice from methanol/ether. The 2-(2-aminoethyl)-10,11-dihydro - 5 - methyl-5H-dibenz[b,f]azepine hydrochloride melts at 209–211°.

Example 12

(a) N - [2 - (5 - methyl - 10,11-dihydro-5H-dibenz[b,f]azepin - 2 - yl) - ethyl]-phthalimide.—A solution of 2.72 g. of 2-(2-chloroethyl)-5-methyl - 10,11 - dihydro-5H-dibenz[b,f]azepine [cp. Example 1(g.)] and 1.85 g. of phthalimide potassium in 100 ml. of dimethyl-formamide is refluxed for 15 hours, with stirring, to 100°. The dimethylformamide is to a great extent distilled off under 11 torr at 60°, and the residue is dissolved in 100 ml. of methylene chloride. The methylene chloride solution is washed with 30 ml. of 2 N sodium hydroxide solution, then with 30 ml. of 2 N hydrochloric acid and 30 ml. of water, dried over magnesium sulphate, and concentrated to dryness under 11 torr at 40°. In this manner are obtained 2.5 g. of crude N-[2-(5-methyl-10,11-dihydro-5H - dibenz[b,f]azepin - 2-yl)-ethyl]-phthalimide which, after recrystallization from ether/petroleum ether, melts at 122–125°.

(b) 2 - (2 - aminoethyl)-10,11-dihydro-5-methyl-5H-dibenz[b,f]azepine hydrochloride.—1.6 g. of N-[2-(5-methyl-10,11 - dihydro - 5H - dibenz[b,f]azepin-2-yl)ethyl]-phthalimide and 0.26 g. of hydrazine hydrate are refluxed to boiling in 15 ml. of ethanol for 6 hours. To the mixture are then added 40 ml. of 20% hydrochloric acid, and refluxing proceeds for a further 15 minutes; the mixture is allowed to cool, and is then made alkaline with concentrated sodium hydroxide solution. The precipitated oil is extracted with 2-N hydrochloric acid and water. The hydrochloric acid extract is made alkaline with 2 N sodium hydroxide solution, the precipitated oil extracted with ether, the ether solution dried over magnesium sulphate, and concentrated under 11 torr at 40°. The residue (0.7 g.) is dissolved in 40 ml. of ether, and ethereal hydrochloric acid then added, whereby white crystals precipitate. These are filtered off and recrystallised three times from methanol/ether. The 2 - (2-aminoethyl)-10,11-dihydro-5-methyl - 5H - dibenz[b,f]azepine hydrochloride melts at 209–211°.

Analogously to Example 12(a) and (b) is produced, starting with 2-(2-chloroethyl)-10,11-dihydro-5H-dibenz[b,f]azepine, 2 - (2 - aminoethyl) - 10,11 - dihydro - 5H-dibenz[b,f]azepine hemifumarate M.P. 231–232°.

Example 13

2 - (2 - aminoethyl) - 10,11 - dihydro - 5H - dibenz[b,f]azepine hemifumarate (2:1).—A solution of 35.5 g. of 2 - (2 - aminoethyl) - 5 - benzyl - 10,11 - dihydro - 5H-dibenz[b,f]azepine in 300 ml. of methanol is saturated at 15° with hydrochloric acid gas. The solution is stirred for 4 days at room temperature, and then concentrated to dryness under 11 torr at 40° bath-temperature. The residue is dissolved in 500 ml. of water, whereby, on standing, the hydrochloride crystallises out. After filtration, the crystals are washed with cold ethyl acetate; they are then suspended in 100 ml. of 2 N sodium hydroxide solution. The liberated base is extracted with 200 ml. of ethyl acetate; the ethyl acetate solution is washed twice with 40 ml. of water each time, dried over magnesium sulphate, and concentrated under 11 torr. The residue, an oil, is dissolved in 100 ml. of methanol. To the methanolic solution is added dropwise a solution of 5.15 g. of fumaric acid in 60 ml. of methanol. The mixture is allowed to stand for 30 minutes at 5°, whereby 2-(2-aminoethyl)-10,11-dihydro-5H-dibenz[b,f]azepine hemifumarate (2:1) crystallises out in crystalline form. After filtration, the crystals are washed with a little cold methanol, M.P. 231–232°.

What is claimed is:
1. A compound of formula

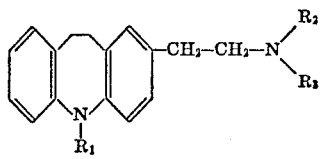

(I)

wherein
$R_1$ is hydrogen, methyl or ethyl,
$R_2$ and $R_3$ independently of each other are hydrogen, or methyl;
and the pharmaceutically acceptable acid addition salts thereof.

2. A compound according to claim 1, which is 2-(2-aminoethyl)-10,11-dihydro-5H-dibenz[b,f]azepine and the hemifumarate thereof.

3. A compound according to claim 1, which is 2-(2-aminoethyl) - 10,11 - dihydro - 5 - methyl - 5H - dibenz[b,f]azepine and the hydrochloride thereof.

References Cited
UNITED STATES PATENTS 3,624,075   11/1971   Fitzi et al. _____ 260—239 D ALTON D. ROLLINS, Primary Examiner U.S. Cl. X.R.

260—326 D; 424—232, 244